United States Patent Office.

SOLOMON M. EISEMAN, OF NEW YORK, N. Y., ASSIGNOR TO THE INTERNATIONAL TRANSPORTATION COMPANY, OF SAME PLACE.

TREATING VOLATILE OR INFLAMMABLE FLUIDS AND OILS.

SPECIFICATION forming part of Letters Patent No. 282,970, dated August 14, 1883.

Application filed June 9, 1883. (No specimens.)

*To all whom it may concern:*

Be it known that I, SOLOMON M. EISEMAN, of the city, county, and State of New York, have invented new and useful Improvements in Treating Volatile or Inflammable Fluids and Oils for Storage, Transportation, and other Purposes, of which the following is a full, clear, and exact description.

The object of this invention is to treat volatile and inflammable fluids and oils—such as petroleum, kerosene, turpentine—and any of their manufactured products, including the most volatile and inflammable—such as gasoline, &c., whether they are of light or heavy specific gravity, of mineral, vegetable, or animal origin—in such a manner that they will be converted into a granulated state. A further object is to confer upon these granules the quality of being able to resist to a certain extent the action of heat, fire, and ordinary atmospheric influences, as well as to confer upon them other desirable properties. As the coated granules ultimately become more or less dry, they thus become transportable, if desired, in bulk without the use of any casing, barrel, or other package, and can at any subsequent time be readily decomposed, in order to regain the volatile or inflammable fluids or oils for their proper uses.

The invention consists in mixing the volatile or inflammable fluid or oil with a fatty substance or substances, together with a suitable acid, which incorporation of acid can take place through the medium of water, oils, the metallic oxides, alkaline substances, or any other liquid or solid substance, the combination of the fluid or oil with the fatty substance and acid to take place at as low a temperature as possible. When the proper incorporation and combination of the substances is effected, the fluid or oil thus obtained is thoroughly mixed with a suitable cold alkaline lye—as, for example, lime or soda dissolved in cold water—which causes an almost immediate coagulation or granulation of the inflammable and volatile fluid or oil treated as stated above.

The invention further consists in dehydrating the granules thus obtained, and then treating them with substances that will envelop them with a covering having the qualities mentioned above—that is, protecting them from heat or atmospheric influences. I find the alkaline silicate or soluble glass the most effective means for producing the desired result, when combined with other substances— such as solution of chloride of lime, gypsum, solution or calcined gypsum-powder, and other substances having the properties of forming combinations having the desired qualities, the above combinations forming a coating of silicate of lime or magnesia, &c.—as a protective envelope around the granules.

In carrying out my invention I prefer to fuse the stearine or other equivalent fatty substance either with the acid or acid combinations, and when the same is melted and liquid to add it to the cool fluid or oil to be granulated. By this means little or no loss of the volatile and inflammable fluid or oil is caused by evaporation.

In order to fully demonstrate the various phases of this invention, as well as some of the means capable of producing the desired results, I herewith give several examples, with the observation that the peculiar acid found in castor-oil furnishes the best and dryest granules, the results of its combination with stearine and the volatile or inflammable fluid or oil to be treated being highly satisfactory.

Example I: One-fourth ounce of stearine is melted with one-eighth ounce of castor-oil and added to one-half pint of ordinary kerosene, cool, if desired, and when thoroughly mixed is poured into a cold alkaline lye of lime or soda. The granules thus formed are then dehydrated, as by draining or otherwise, and mixed with a solution of soluble glass, and are then mixed with a solution of chloride of lime—for instance, chalk dissolved in water and muriatic acid. This gives the granules a coating of silicate of lime.

Example II: One-fourth ounce of stearine is melted. Five or six drops of sulphuric acid, diluted with water, are mixed with it, and the mixture is poured into the oil, which is thus granulated. Calcined magnesia may be used for forming an envelope of a silicate of magnesia around the granules.

Example III: Melted stearine is mixed with diluted muriatic acid. This mixture is poured into crude petroleum, and the coating may be formed of gypsum or talc.

Example IV: One-fourth ounce of stearine is melted with one-eighth ounce of castor-oil, and this mixture is then mixed with one-half of a pint of cold gasoline, which, when the mixture is complete, coagulates, and the granules are coated with soluble glass and sulphate of lime, either as a thick watery solution or as a dry powder. Sulphate of magnesia, (Epsom salts,) acetate of lead, the acid combinations of metallic oxides, and alkaline or oily substances which have been acidulated, may be used in place of the few drops of acid mentioned in the several examples. The efflorescence caused by the use of Epsom salts, sugar of lead, metallic oxides, &c., being objectionable in kerosene, I prefer to use castor-oil or a few drops of acid diluted with water.

By using a lime solution for the alkaline fluid for the purpose of effecting the granulation the efflorescence will also be modified, and will combine very readily with the subsequent treatment with soluble glass to form the coating of silicate of lime. The various proportions of the substances used, as well as the dilution of the materials used to produce the desired results, may naturally be varied without affecting the principles of my invention.

If desired for only temporary use, or for transportation over short distances only, or for other purposes, the granules may be melted into a more or less compact or solid mass after they have been dehydrated, and in this case the fire or weather resisting coating may be dispensed with; but this melted and subsequently solidified mass of granulated fluid or oil will naturally be less proof against destruction than the granules coated as previously described.

In order to regain the volatile or inflammable fluid and oil from the fire and weather resiting granules, I decompose the above-described enveloped granules of volatile or inflammable fluid or oil, and this process causes a recovery of the substances held in combination with the fluid or oil. To obtain this result the most expedient means are to melt the granules and mix them while in a pasty or viscous state with acidulated water. The decomposition may also be effected by acidulated water alone without melting the granules, this being particularly valuable for the extremely volatile fluids and oils, although it is not quite so speedy as the first-mentioned method. The result is always the same, whatever means may be resorted to to regain the fluid or oil. The volatile and inflammable fluid or oil will be released or separated from the various substances with which it has been combined, which substances collect, respectively, at the surface of the water or below the volatile inflammable fluid or oil, according to their several specific gravities. The conversion of the stearine or castor-oil into their fatty acids will be very readily accomplished if a powerful acid—such as sulphuric acid—is used for the decomposition of the coated granules.

For crude petroleum in the form of enveloped granules, distillation affords a ready means of decomposition, and permits of the refining of the crude petroleum in one operation, with the separation of the same from the substances with which it has been combined in granulating and coating it.

Having thus described my invention, what I claim as new, and desire to secure by Letters Patent, is—

1. As a new article of manufacture, volatile or inflammable fluids and oils converted into a granulated fire and weather resisting state, substantially as herein described.

2. As a new article of manufacture, volatile or inflammable fluids and oils mixed with castor-oil, together with stearine or other equivalent fatty substances, and coagulated or granulated at a low temperature by mixture with a liquid lye or an equivalent substance, substantially as herein described.

3. As a new article of manufacture, volatile or inflammable fluids and oils converted into granules which are provided with heat and weather resisting coatings, substantially as herein described.

4. As a new article of manufacture, volatile or inflammable fluids and oils converted into granules and provided with protective envelopes or coverings of silex combinations, substantially as described.

5. The herein-described process of granulating or coagulating volatile or inflammable fluids and oils, which consists in dissolving in or mixing with the fluid or oil to be granulated a fatty substance, together with acid or combinations thereof, preferably at a low degree of heat, and mixing the so treated volatile or inflammable fluid or oil with liquid lye for producing the granulation of the fluid or oil so treated, substantially as set forth.

6. The herein-described process of granulating or coagulating volatile or inflammable fluids and oils, consisting in dissolving in or mixing with them stearine or other suitable fatty substance, together with castor-oil and with a fluid lye, substantially as set forth.

7. The herein-described process of producing fire and weather resisting granulated volatile and inflammable fluids and oils, consisting in granulating the fluid or oil, and then providing the granules with a coating of a substance adapted to resist the effects of heat or the influences of the atmosphere, substantially as set forth.

8. The herein-described process of producing fire and weather resisting granulated or coagulated volatile and inflammable fluids and oils, consisting in granulating the fluid or oil, and then mixing the granules with a solution of silex combinations, substantially as set forth.

9. The recovery of the liquid volatile and inflammable fluid or oil, together with the substances combined therewith, from granules of the volatile and inflammable fluid and oil, provided with a fire and weather resisting coating by decomposing the said coated granules, substantially as herein described.

SOLOMON M. EISEMAN.

Witnesses:
OSCAR F. GUNZ,
C. SEDGWICK.